United States Patent
Ogle et al.

(10) Patent No.: US 10,150,910 B2
(45) Date of Patent: Dec. 11, 2018

(54) WELL TREATMENT FLUIDS COMPRISING CROSS-LINKABLE POLYSACCHARIDES

(71) Applicant: HALLIBURTON ENERGY SERVICES, INC., Houston, TX (US)

(72) Inventors: James William Ogle, Spring, TX (US); Aaron M. Beuterbaugh, Spring, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/325,064

(22) PCT Filed: Jul. 31, 2014

(86) PCT No.: PCT/US2014/049178
§ 371 (c)(1),
(2) Date: Jan. 9, 2017

(87) PCT Pub. No.: WO2016/018374
PCT Pub. Date: Feb. 4, 2016

(65) Prior Publication Data
US 2017/0183561 A1    Jun. 29, 2017

(51) Int. Cl.
*E21B 37/00* (2006.01)
*C09K 8/72* (2006.01)
(Continued)

(52) U.S. Cl.
CPC .............. *C09K 8/725* (2013.01); *C09K 8/035* (2013.01); *C09K 8/08* (2013.01); *C09K 8/10* (2013.01);
(Continued)

(58) Field of Classification Search
CPC .......... C09K 8/725; C09K 8/035; C09K 8/08; C09K 8/10; C09K 8/512; C09K 8/514;
(Continued)

(56) References Cited

U.S. PATENT DOCUMENTS 5,304,620 A * 4/1994 Holtmyer ................ C09K 8/08
166/278
5,558,161 A * 9/1996 Vitthal ................... C09K 8/685
166/280.1

(Continued)

FOREIGN PATENT DOCUMENTS

CA    2595978    1/2006

OTHER PUBLICATIONS

PCT International Search Report and Written Opinion, dated Apr. 27, 2015, Appl No. PCT/US2014-048178,"Methods to Place Fluid Loss Materials," Filed Jul. 31, 2014, 15 pgs.
(Continued)

*Primary Examiner* — Silvana C Runyan
(74) *Attorney, Agent, or Firm* — Thomas Rooney; Tumey L.L.P.

(57) ABSTRACT

A method of treating a subterranean formation includes providing a treatment fluid comprising a crosslinkable polymer prepared by a redox reaction with vinyl phosphonic acid monomers or polymers and a polysaccharide, and at least one of a hydrolysable in-situ acid generator and a chelating agent, providing a carrier fluid comprising a brine, providing a metal crosslinker, placing all into a formation, allowing the polymer of to crosslink, and allowing the crosslinked polymer to become uncrosslinked. A wellbore fluid includes a crosslinkable polymer prepared by a redox reaction with vinyl phosphonic acid monomers or polymers and hydroxyethyl cellulose; at least one of a hydrolysable in-situ acid generator, a chelating agent, and mixtures thereof; a carrier fluid comprising a brine; and a metal crosslinker.

21 Claims, 2 Drawing Sheets

(51) Int. Cl.
  *C09K 8/08* (2006.01)
  *C09K 8/512* (2006.01)
  *C09K 8/514* (2006.01)
  *C09K 8/52* (2006.01)
  *C09K 8/575* (2006.01)
  *C09K 8/68* (2006.01)
  *C09K 8/70* (2006.01)
  *C09K 8/74* (2006.01)
  *C09K 8/88* (2006.01)
  *C09K 8/90* (2006.01)
  *C09K 8/035* (2006.01)
  *C09K 8/10* (2006.01)
  *C09K 8/12* (2006.01)

(52) U.S. Cl.
  CPC .............. *C09K 8/12* (2013.01); *C09K 8/512* (2013.01); *C09K 8/514* (2013.01); *C09K 8/52* (2013.01); *C09K 8/5756* (2013.01); *C09K 8/5758* (2013.01); *C09K 8/685* (2013.01); *C09K 8/706* (2013.01); *C09K 8/74* (2013.01); *C09K 8/887* (2013.01); *C09K 8/90* (2013.01); *E21B 37/00* (2013.01); *C09K 2208/26* (2013.01)

(58) Field of Classification Search
  CPC ........ C09K 8/52; C09K 8/5758; C09K 8/685; C09K 8/74; C09K 8/887; C09K 8/90; C09K 2208/26; E21B 37/00
  USPC ........................................................ 166/300
  See application file for complete search history.

(56) References Cited

U.S. PATENT DOCUMENTS

| | | | |
|---|---|---|---|
| 6,814,145 | B2* | 11/2004 | Maberry ............... C09K 8/502 106/719 |
| 7,795,186 | B2 | 9/2010 | Saini et al. |
| 2009/0044945 | A1* | 2/2009 | Willberg .............. C09K 8/706 166/308.1 |
| 2009/0258801 | A1* | 10/2009 | Saini .................... C09K 8/506 507/213 |
| 2010/0163225 | A1* | 7/2010 | Abad ...................... C09K 8/52 166/263 |
| 2014/0069643 | A1 | 3/2014 | William et al. |
| 2014/0182854 | A1 | 7/2014 | Mukhopadhyay |

OTHER PUBLICATIONS

Canadian Examination Report for Application No. 2,955,342 dated Jan. 18, 2018.

* cited by examiner

WELL TREATMENT FLUIDS COMPRISING CROSS-LINKABLE POLYSACCHARIDES

BACKGROUND

The present invention generally relates to the use of gellable treatment fluids in subterranean operations, and, more specifically, to the use of gellable treatment fluids comprising derivatized hydroxyethylcellulose, hydrolysable in-situ acid generators, chelating agents, brines, and cross-linking agents, and methods of using these treatment fluids in subterranean operations.

Treatment fluids can be employed in a variety of subterranean operations. As used herein the terms "treatment," "treating," other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Illustrative subterranean operations that can be performed using treatment fluids can include, for example, drilling operations, fracturing operations, sand control operations, gravel packing operations, acidizing operations, conformance control operations, fluid diversion operations, fluid blocking operations, and the like.

In many cases, treatment fluids can be utilized in a gelled state when performing a treatment operation. For example, in a fracturing operation, a treatment fluid can be gelled to increase its viscosity and improve its ability to carry a proppant or other particulate material. In other cases, a gelled treatment fluid can be used to temporarily divert or block the flow of fluids within at least a portion of a subterranean formation. In the case of fracturing operations, the gelled treatment fluid typically spends only a very short amount of time downhole before the gel is broken and the treatment fluid is produced from the wellbore. In fluid diversion or blocking operations, the gel typically needs to remain in place only for a short amount of time while another treatment fluid is flowed elsewhere in the subterranean formation.

When conducting subterranean operations, it can sometimes become necessary to block the flow of fluids in the subterranean formation for a prolonged period of time, typically for at least about one day or more. In some cases, the period of time can be much longer, days or weeks. For example, it can sometimes be desirable to impede the flow of formation fluids for extended periods of time by introducing a kill pill or perforation pill into the subterranean formation to at least temporarily cease the communication between wellbore and reservoir. As used herein, the terms "kill pill" and "perforation pill" refer to a small amount of a treatment fluid introduced into a wellbore that blocks the ability of formation fluids to flow into the wellbore. In kill pill and perforation pill applications, high density brines can be particularly effective as a carrier fluid, since they can form a highly viscous gel that blocks the flow of fluids within the wellbore by exerting hydrostatic pressure therein. Likewise, in fluid loss applications, it can sometimes be desirable to form a barrier within the wellbore that persists for an extended period of time.

For subterranean operations requiring extended downhole residence times, many gelled treatment fluids can prove unsuitable since they can break before their intended downhole function is completed. The premature break of gelled treatment fluids can be particularly problematic in high temperature subterranean formations (e.g., formations having a temperature of about 275° F. or above), where the elevated formation temperature decreases the gel stability and speeds gel decomposition. As subterranean operations are being conducted in deeper wellbores having ever higher formation temperatures, the issues with long-term gel stability are becoming an increasingly encountered issue as existing gels are being pushed to their chemical and thermal stability limits.

Traditionally, the decomposition of a gel into lower viscosity fluids may be accomplished by using a breaker. An external breaker may be needed to remove a fluid loss pill upon well completion. Breaker compounds useful in high temperature formations may have high corrosion rates and may be harmful to the formation. Hydrochloric acid can be spotted on top of the gelled fluid. If HCl is spotted above the pill it takes time to break the pill as the acid must diffuse down through the pill and multiple spotting can be required depending on the gel-pill size, density of acid vs. the density of the pill and the well bore temperature. Additionally, operators usually prefer to use a self-degrading pill instead of a pill needing an external breaker. Therefore, a need exists for self-degrading, crosslinkable treatment fluid useful in subterranean operations.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
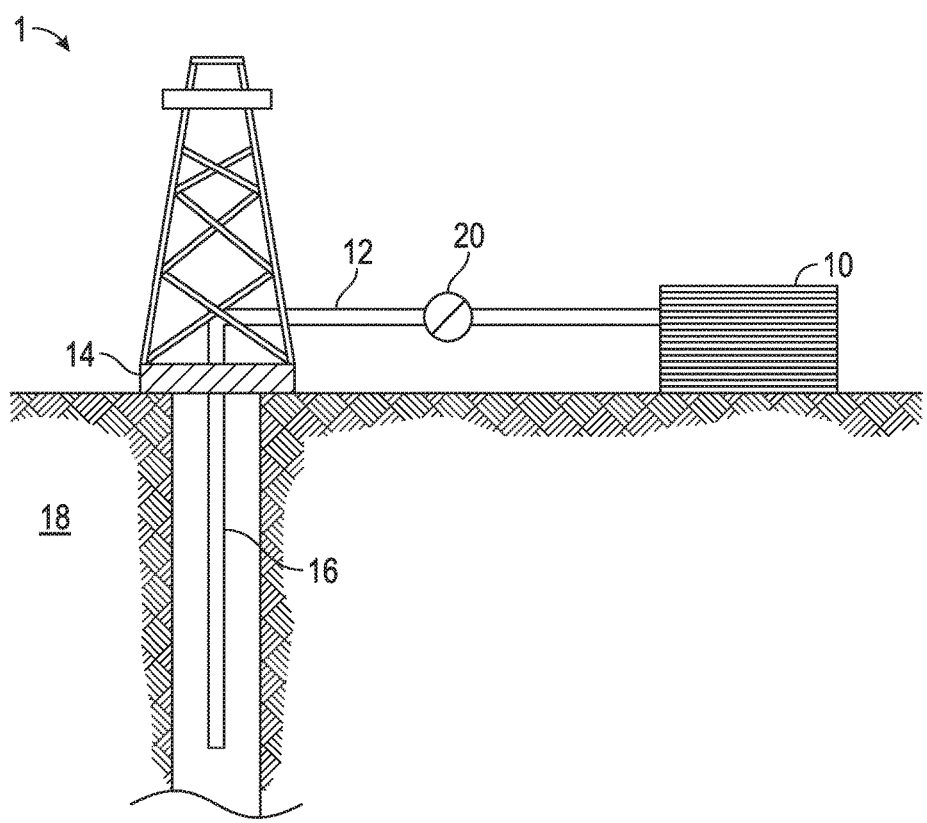
FIG. 1 depicts an embodiment of a system configured for delivering the decrosslinking and breaking compositions comprising treatment fluids of the embodiments described herein to a downhole location.

In an embodiment of the invention, low pH acid generating compounds and chelating agents are added into divalent and monovalent cation crosslinked polymer systems to both decrosslink and break the fluid system.

In some embodiments of the present invention, a method of treating a wellbore in a subterranean formation includes providing a first fluid comprising a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof; providing a carrier fluid comprising a brine; providing a metal crosslinker; placing a first stream comprising the first fluid; the carrier fluid, and the metal crosslinker into a formation; allowing the crosslinkable polymer of said first stream to crosslink; and allowing the crosslinked polymer to become un-crosslinked. In some embodiments, the crosslinkable polymer is a graft copolymer of hydroxyethylcellulose. In some embodiments, the polysaccharide is at least one member selected from the group of guar, hydroxypropyl guar, hydroxyethyl cellulose, hydroxypropyl cellulose, and mixtures thereof. In other embodiments, the hydrolysable in-situ acid generator comprises at least one hydrolysable strong acid ester that upon hydrolyzing yields an acid with a pKa of at most about zero. In further embodiments, the hydrolysable acid ester comprises at least one member selected from the group consisting of trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates), methyl tosylate and homologous series; methyl methane sulfonate and homologous series; methyl trichloroacetate and homologous series; methyl trifluroacetate and homologous series; dimethyl methylphosphonate and homologous series; and any combination thereof. In an exemplary embodiment, the initial pH of the first fluid is less than about 1. In a further embodiment, upon being hydrolyzed, the hydrolysable in-situ acid generator decreases the pH of the fluid containing the crosslinked polymer to less than about 5. In another embodiment, the hydrolysable in-situ acid generator decreases the pH of the crosslinked polymer fluid such that the crosslinked polymer fluid becomes at least partially un-crosslinked. In some embodiments, the brines are selected from the group consisting of NaCl, KCl, CaCl$_2$, NaBr, NH$_4$Cl, sea water, CaCl$_2$/CaBr$_2$, and combinations thereof. In other embodiments, when placed in the brines, the metal crosslinker raises the pH to at least about 8. The method may further comprise a mixing tank fluidly coupled to a tubular, wherein the first stream is formulated in the mixing tank. Additionally, the method may further comprise a pump fluidly coupled to said tubular, wherein said pump and tubular are used to transport the first stream from the mixing tank to a wellhead. In another embodiment, the method may further comprise a mixing tank fluidly coupled to a tubular, wherein the first fluid is formulated in the mixing tank. In a further embodiment, the carrier fluid and metal crosslinker may be combined with the first fluid after the first fluid leaves the mixing tank.

In one embodiment, a chelating agent un-crosslinks the crosslinked polymer and comprises at least one of the following ethylenediamine tetracetic acid (EDTA), nitrilotriacetic acid (NTA), N-(2-hydroxyethyl)ethylenediaminetetraacetic acid (HEDTA), glutamic acid diacetic acid (GLDA), methylglycine diacetic acid (MGDA), iminodisuccinic acid (IDS), propylenediaminetetraacetic acid (PDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, β-alanine diacetic acid (β-ADA), ethylenediaminedisuccinic acid, S,S-ethylenediaminedisuccinic acid (EDDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5 any salt thereof, any derivative thereof, and combinations thereof.

In some embodiments, the hydrolysable in-situ acid generator is an orthoester with the general formula RC(OR')(OR'')(OR'''), wherein R is a hydrogen, an alkyl group, or an aryl group, wherein R', R'', and R''' are each an alkyl group or an aryl group but not hydrogen, and R', R'', and R''' may or may not be the same group. In certain embodiments, upon being hydrolyzed, the hydrolysable in-situ acid generator decreases the pH of the fluid containing the crosslinked polymer to less than about 1, thereby hydrolyzing the backbone of the polymer.

In some embodiments, wherein at least one of the first fluid hydrolysable in-situ acid generator and chelating agent are encapsulated in a degradable material that is a hydrolysable material that delays the generating of the acid or exposing of the chelating agent to the fluid.

In certain embodiments of the present invention, a method of treating a subterranean formation includes providing a first fluid comprising a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof; providing a carrier fluid comprising a brine; providing a metal crosslinker; placing a first stream comprising the first fluid; the carrier fluid, and the metal crosslinker into a subterranean formation, wherein said first stream has an initial pH less than about 1; allowing the pH of the placed first stream to rise to at least about 8; allowing the crosslinkable polymer of said first stream to crosslink; and allowing the pH of the fluid containing the crosslinked polymer to decrease to less than about 1, thereby hydrolyzing the polymer backbone of the crosslinked polymer. The polysaccharide may be at least one member selected from the group of guar, hydroxypropyl guar, hydroxyethyl cellulose, hydroxypropyl cellulose, and mixtures thereof.

Another embodiment of the invention is directed to a wellbore fluid including a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof; a carrier fluid comprising a brine; and a metal crosslinker. The polysaccharide may be at least one member selected from the group of guar, hydroxypropyl guar, hydroxyethyl cellulose, hydroxypropyl cellulose, and mixtures thereof.

A further embodiment of the invention is directed to a wellbore treatment system including an apparatus configured to: place a first stream comprising a first fluid, a carrier fluid comprising a brine, and a metal crosslinker into a subterranean formation, wherein the first fluid comprises: a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof, allow the polymer of said first stream to crosslink, and allow the crosslinked polymer to become un-crosslinked. The system may further comprise a mixing tank fluidly coupled to a tubular, wherein the first stream is formulated in the mixing tank. Additionally, the system may further comprise a pump fluidly coupled to said tubular, wherein said pump and tubular are used to transport the first stream from the mixing tank to a wellhead. In another embodiment, the system may further comprise a mixing tank fluidly coupled to a tubular, wherein the first fluid is formulated in the mixing tank. In a further embodiment, the carrier fluid and metal crosslinker may be combined with the first fluid after the first fluid leaves the mixing tank.

One of the advantages of some embodiments of the present invention is the ability to tailor the rate of reducing the viscosity of a fluid loss pill to the actual well conditions. This may occur by changing the composition of the carrier fluid such that the pH is higher or lower, or of the encapsulation material. Other advantages may be evident to one skilled in the art.

In certain embodiments, before the reaction occurs, the treatment fluids of the present invention may comprise a carrier fluid; a hydrolysable in-situ acid generator; and or a chelating agent. After the hydrolysis of the acid occurs, a treatment fluid in accordance with the present invention may comprise a carrier fluid and at least one of an acid and a chelating agent.

Crosslinkable Polymers

Polymers useful in the present invention are certain graft copolymers of hydroxyethyl or hydroxypropyl cellulose, prepared by a redox reaction with vinyl phosphonic acid monomers or polymers and hydroxyethyl or hydroxypropyl cellulose. These polymers can be crosslinked by the addition of a Lewis base or Bronsted-Lowry base or mixture of such bases to an aqueous solution, which contains at least a trace amount of at least one divalent cation, containing the graft copolymer. In an embodiment, the polymers of the present invention may be made by admixing (1) an aqueous liquid containing at least a trace amount of at least one divalent cation with (2) a polymer derivative that is chemically modified by reacting at least one member selected from the group of guar, hydroxypropyl guar, hydroxyethyl cellulose and hydroxypropyl cellulose with a vinyl phosphonic acid in the presence of a redox system. The chemical modification of the polymer may be defined further as reacting said member with a vinyl phosphonic acid in a reaction media comprising at least one member selected from the group of tetramethyl ammonium chloride, polyethylene glycol and polypropylene glycol to which a redox initiator is added. The redox system may include a peroxide and a metal ion reductant.

These modified polymers are known in the art. See U.S. Pat. No. 5,304,620 as one example. In one embodiment, cellulose derivatives in the present invention are a hydroxyalkyl cellulose having a hydroxyalkyl molar substitution from about 1.5 to about 3.0. Molar substitution is defined as the average number of moles of a substituent group present per anhydroglucose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkylation of the cellulose is preformed in a separate reaction. Hydroxyethyl cellulose is usually formed by reacting ethylene oxide with cellulose under extreme alkaline conditions and is available commercially. The copolymers of the present invention are rendered crosslinkable by grafting monomers comprising a vinyl phosphonic acid to the cellulose derivative. A commercially obtainable derivatized hydroxyethylcellulose is WG-33™, available from Halliburton Energy Services, Inc., Houston, Tex.

A commercially available system with crosslinkable polymers like WG-33™ is the K-MAX Plus™ service pill, also available from Halliburton Energy Services, Inc. K-MAX Plus service pills are made from a specially derivatized hydroxyethylcellulose (HEC, WG-33) that is crosslinkable in a variety of brines ranging from 8 to 14 lb/gal, and is used to prevent the flow of completion or treating fluid into the formation after perforating operations and before and after gravel-packing. It is also used in variety of other operations such as maintaining formation support in unstable zones and preventing sloughing into the wellbore, in zone isolation to aid in water control, in cementing and in fracturing treatment.

The K-MAX Plus™ service pill can be broken by contacting with acids or internal breakers (oxidizers). An internal breaker will cause a gradual reduction in viscosity and thus the pill will become more and more unstable as time goes by. Breakage by internal breakers can also result in low regained permeability.

The K-MAX Plus™ service pill suffers from several disadvantages. First, most K-MAX Plus™ service pills can be circulated out of the fluid loss zone after the treatment through the use of a coiled tubing trip which is time consuming and risky in offshore deep wells. HCl is still required as an external breaker to clean the remainder of the gel. Sometimes the contact with the acid is not obtained in the formation leaving the gel intact in some places.

Second, all K-MAX Plus™ service pills can also be broken by contact with 10 to 15% HCl acid. But, if HCl is spotted above the pill it takes time to break the pill as the acid must diffuse down through the pill and multiple spotting can be required depending on the gel-pill size, density of acid vs. the density of the K-MAX Plus™ service pills and well bore temperature. For a quick break, the spotting of HCl across the pill requires the use of coiled tubing which is time consuming and a complicated process.

The deficiencies discussed above would benefit greatly from a breaker or cleanup treatment that would become strongly activated after remaining inactive for a period of days. A chemical system that offers the triggered the release of a breaker is highly desirable. The present invention describes a way to introduce internal breakers in a K-MAX™ service type of pill and demonstrates the controlled triggered delayed break of the pill. The invention exploits two characteristics of K-MAX™ service. The first is that reducing the pH to about 4 to about 5 reverses the crosslinking, reducing viscosity and allowing flow to clean up the fluid loss pill.

Second, chelation of the crosslinked polymer can reverse the crosslinking, reducing viscosity and allowing flow to clean up the fluid loss pill. Furthermore, reducing the pH far below 4 will cause the polymer to hydrolyze and further reduce viscosity.

Carrier Fluids

In some embodiments, carrier fluids are used to deliver the hydrolysable in-situ acid generator and chelating agents into a wellbore. The carrier fluid that is used to deposit the particles in the fracture may be the same fluid that is used in a prior wellbore treatment operation or may be a second fluid that is introduced into the well after the first treatment fluid is introduced.

The carrier fluids of the present embodiments can generally be from any source, provided that the fluids do not contain components that might adversely affect the stability and/or performance of the treatment fluids of the present invention. In various embodiments, the carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In an exemplary embodiment, preferred brines comprise NaCl, KCl, $CaCl_2$, NaBr, $NH_4Cl$, sea water, $CaCl_2/CaBr_2$, and combinations thereof. In some embodiments, the aqueous carrier fluid can be a high density brine. As used herein, the term "high density brine" refers to a brine that has a density of about 10 lbs/gal or greater (1.2 $g/cm^3$ or greater).

In some embodiments, the carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

Hydrolysable Acid Generating Compounds

The treatment fluids of the present invention also include hydrolysable in-situ acid generating compounds. In some embodiments, these are esters, aliphatic polyesters, ortho esters, which may also be known as ortho ethers, poly (ortho esters), which may also be known as poly(ortho ethers), poly(lactides), poly(glycolides), poly(c-caprolactones), poly (hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers. In several embodiments, the hydrolysable acid ester comprises at least one member selected from the group consisting of homo- and copolymers of lactic and glycolic acid, homo- and copolymers of vinyl methylsulphonate and vinyl methylphosphonate and dimethylphosphonate; and any combination thereof. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. In various embodiments, an amount of the hydrolysable in-situ acid generating compound present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Orthoesters

The orthoester compositions of the invention comprise orthoesters. These orthoesters will generate acids that will degrade the foam. Examples of suitable orthoesters have a structure defined by the formula: RC(OR')(OR'')(OR'''), wherein R is a hydrogen, an alkyl group, or an aryl group, wherein R', R'', and R''' are each an alkyl group or an aryl group but not hydrogen, and wherein R', R'', and R''' may or may not be the same group. Any one or more of R, R', R'', and R''' may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates).

Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors. The orthoester may comprise less than about 1% to about 100% of the orthoester composition.

To allow the orthoester to hydrolyze to produce an acid, a source of water is needed, whether from the formation or introduced into the formation. The water should be present in an amount from about 2 moles of water for about every 1 mole of orthoester to an excess of water.

The orthoester compositions of the invention also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions of the invention can have any suitable form. For instance, these compositions can be used in a solution form, a gel form, or an emulsion form. In certain applications, a solution form may be useful, e.g., when a faster is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Inc., Houston, Tex.

In alternative embodiments of the methods of the invention, an orthoester composition of the invention may be coated or impregnated onto a particulate that will be placed downhole in a subterranean fracturing treatment. When the orthoester ultimately hydrolyzes and generates the acid, it may act as a breaker for a viscosified treatment fluid, such as a fracturing fluid.

Any particulate suitable for use in as proppants in conjunction with fracturing applications is suitable for use as particulates in these embodiments of the methods of the invention. For instance, natural sand, quartz sand, particulate garnet, glass, ground walnut hulls, polymeric pellets, bauxite, ceramics, fibers, or the like are all suitable. Suitable sizes range from about 4 to about 100 U.S. mesh, in certain preferred embodiments, the sizes may range from about 10 to about 70 U.S. mesh.

The orthoester compositions of the invention may be coated onto a particulate material by any means known in the art. For instance, in one embodiment, the particulates may be coated with an orthoester composition "on-the-fly." The term "on-the-fly" is used herein to refer to an instance where one flowing stream is continuously introduced into another flowing stream so that the streams are combined and mixed while continuing to flow as a single stream as part of an ongoing treatment. Such mixing can also be described as "real-time" mixing. Batch or partial batch mixing processes may also be suitable. The coated particulate as described herein may be used as proppant particles in fracturing operations or as any other particulate employed in subterranean operations that may be placed substantially adjacent to a foam comprising an acid reactive component. Particulates may include but are not limited to proppants, encapsulated chemicals, encapsulated breakers, encapsulated oxidizers, encapsulated enzymes, encapsulated scale inhibitors, solid scale inhibitors, poly(lactic acid), mixtures thereof and the like.

Where the orthoester composition is a relatively solid material at ambient temperatures, it may be advantageous to mix the orthoester composition with a solvent to facilitate the coating of the orthoester composition onto the particulates. A variety of solvents known in the art may be suitable. Some such solvents include, but are not limited to, acetone, propylene carbonate, dipropylene glycol methyl ether, methylene chloride, isopropyl alcohol, or combinations thereof.

In some embodiments of the invention, the particulates are coated with from about 0.1% to about 20% orthoester composition by weight of the particulates, more preferably from about 0.5% to about 10% orthoester composition by weight of the particulates, and most preferably from about 1% to about 8% orthoester composition by weight of the particulate material.

In some embodiments, 100% of the particulates are coated with an orthoester composition of the invention; in other embodiments, only a portion of the particulates may be coated. Where less than 100% of the particulates are coated with an orthoester composition of the invention, it may be desirable to use a higher concentration of orthoester composition relative to that portion of the particulates to be coated. It is within the ability of one skilled in the art with the benefit of this disclosure to determine the amount of orthoester composition that will be necessary to sufficiently alter the surfactant.

In a fracturing operation, the proppant pack formed inside a fracture from at least some of the coated particulates of the invention may be formed using any technique known in the art. In one technique, proppant particulates comprising at least some coated particulates of the invention are slurried into the foamed fracturing fluid and pumped into a subterranean formation at a pressure sufficient to create or enhance a fracture in the formation. At least a portion of those particulates is then placed in a fracture and forms a proppant pack substantially adjacent to the walls of the fracture. Once the proppant pack is substantially formed, the orthoester composition produces an acid that at least partially degrades the filter cake on the surfaces of the fracture.

The orthoester can be introduced into the formation prior to, concurrent with, or subsequent to introduction of the fracturing fluid to achieve the desired change in pH. Preferably, the orthoester is introduced concurrently with the fracturing fluid.

Chelating Agents

The treatment fluids of the present invention may optionally include a chelating agent with or without the hydrolysable acid generating compounds. Chelating agents can be used to chelate metal crosslinkers used in the fluids of the present invention. These ligands have specific pH ranges that dictate the ability to bind to divalent metal cations or not. By controlling the pH of the chelating agents, one can achieve specific decrosslinking and viscosity reduction of the fluid.

In some embodiments, the chelating agent comprises at least one of the following ethylenediamine tetracetic acid (EDTA), nitrilotriacetic acid (NTA), N-(2 -hydroxyethyl) ethylenediaminetetraacetic acid (HEDTA), glutamic acid diacetic acid (GLDA), methylglycine diacetic acid (MGDA), iminodisuccinic acid (IDS), propylenediaminetetraacetic acid (PDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid,β -alanine diacetic acid (β-ADA), ethylenediaminedisuccinic acid, S,S-ethylenediaminedisuccinic acid (EDDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2 -dicarboxyethoxy)ethyl]methylglycine (MCBA5), N-tris[(1,2 -dicarboxyethoxy)ethyl] amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2 -acetamido)iminodiacetic acid (ADA), hydroxymethyl-iminodiacetic acid, 2-(2 -carboxyethylamino) succinic acid (CEAA), 2-(2-carboxymethylamino) succinic acid (CMAA), diethylenetriamine-N,N"-disuccinic acid, triethylenetetramine-N,N''' -disuccinic acid, 1,6-hexamethylenediamine-N,N'-disuccinic acid, tetraethylenepentamine-N,N''''-disuccinic acid, 2-hydroxypropylene-1,3-diamine-N,N' -disuccinic acid, 1,2-propylenediamine-N,N'-disuccinic acid, 1,3 -propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5 any salt thereof, any derivative thereof, and combinations thereof. In certain embodiments, the hydrolysable in-situ chelating agent is present in the amount of about 0.1% to about 25% by weight of the carrier fluid.

The chelating agents of the present invention may also include hydrolysable in-situ chelating agent generating compounds. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta (methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid.

Chelants are pH dependent and can chelate at pH's ranging from less than about 1 to as high as greater than 11 depending on the nature of the chelant. In certain embodiments, this degree of variability exhibited in chelants will enable the de-crosslinking to occur at a desired pH range therefore making the breaker system highly variable and tailored to specific needs.

In continuation, various chelants display different binding constants (log K) to a wide array of metals. This will prove advantageous when a specific or a broad range of metal cross-linkers will need to be removed from the fluids of the present invention. In one embodiment, chelating agents provide the ability to adjust the pH and/or the chelant, therefore enabling de-crosslinking to occur at a desired, specific time.

Crosslinking Compounds

The crosslinking agent of the first embodiment of the claimed subject matter is a divalent, trivalent, or tetravalent cation such as, for example, $Mg^{2+}$, $Ca^{2+}$, $Fe^{2+}$, $Cd^{2+}$, $Cu^{2+}$, $UO_2^{2+}$, $PbO^{2+}$, $Al^{3+}$, $Fe^{3+}$, $Ce^{3+}$, $Sn^{4+}$, $Zr^{4+}$, $Ti^{4+}$, and the like. A preferred crosslinking agent of the claimed subject matter is a trivalent transition metal cation such as, for example, $Fe^{3+}$, $Ce^{3+}$, and the like. A commercially obtainable crosslinking agent is CL-30™, available from Halliburton Energy Services, Inc., Houston, Tex. CL-30™ is a slow dissolving base with raises the pH to 8 to 9 at which time a gel like those of the present invention becomes crosslinked.

Encapsulated Compounds

In some embodiments, hydrolysable in-situ acid generating compound is encapsulated in a hydrolysable material. In certain embodiments, the encapsulated hydrolysable material forms a capsule. Compounds comprising an acid generator or a chelating agent generator suitable for use in the present invention may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like. Using encapsulated well treatment chemicals permits blending of normally incompatible compounds in the treatment fluid. As a non-limiting example, the present invention permits the transport of the hydrolysable acid generator to a downhole environment by a treatment fluid having a neutral or basic pH without detrimentally impacting either the treatment fluid or the acid generating compound, such as an acid ester. A non-limiting list of mechanisms suitable for releasing the encapsulated acid and chelating generating compounds includes: a change in pH, crushing, rupture, dissolution of the membrane, diffusion and/or thermal melting of the encapsulating membrane. Following placement of the compounds downhole, the acid generating compounds are then released from the capsules and allowed to react. The controlled downhole release of the acid and chelating agent generating compounds will significantly improve their functionality.

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions. Particulates as used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand). A particulate will have a particle size distribution ("PSD"). As used herein, "the size" of a particulate can be determined by methods known to persons skilled in the art.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

One of skill in the art will realize that the fluids and methods of the present invention offer several advantages over the technology currently used in the industry. First, low-pH esters are utilized in the present invention, whereas in the past they were not commercially available. Second, no chelation strategies were used in the past to scavenge and decrosslink the fluid systems. Third, only moderately acidic environments, pH 5-3, were previously created. The present acid-generating systems can actually go to much lower pH and can hydrolyze the polymer backbone much more readily.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable stimulation treatments where a treatment fluid of the present invention may be suitable. Other potential applications of this resin system, with some minor adjustments such as modifying the dilution factor with the carrier fluid or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid may be introduced into the wellbore, the formation, or a lost circulation zone as a single pill fluid. That is, in such an embodiment, all components of the treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation. In wells penetrating certain formations, it is often desirable to create relatively small fractures referred to in the art as "microfractures" in the formations near the wellbores to facilitate creation of hydraulically induced enlarged fractures.

The substance of a "gel" is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

In various embodiments, systems configured for delivering the treatment fluids described herein to a downhole location are described. In various embodiments, the systems can comprise a pump fluidly coupled to a tubular, the tubular containing the hydrolysable in-situ acid generator and/or hydrolysable in-situ chelating agent generator, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for carrier downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLE

The invention having been generally described, the following example is given as a particular embodiment of the invention and to demonstrate the practice and advantages hereof. It is understood that the example is given by way of illustration and are not intended to limit the specification or the claims to follow in any manner.

Figure 2:
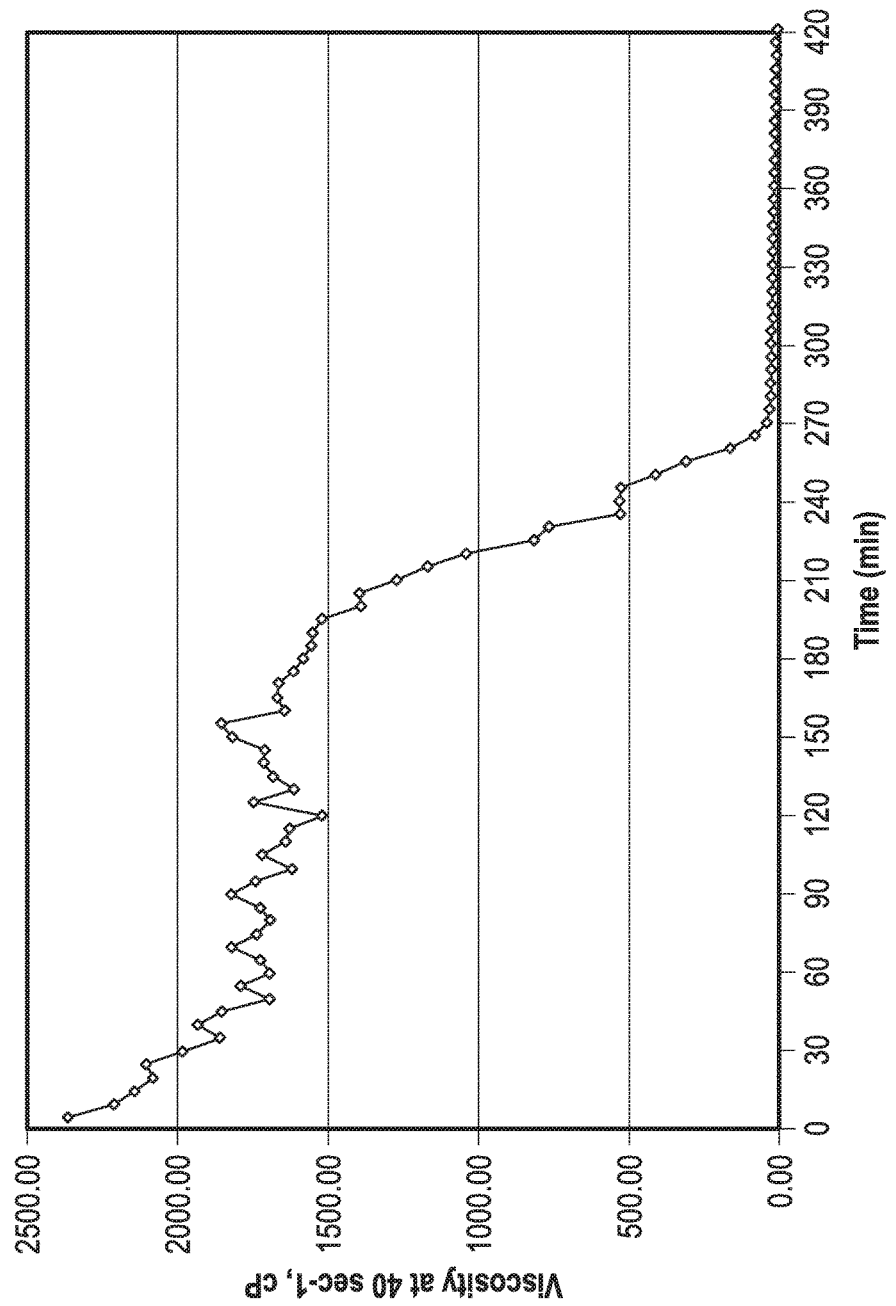
FIG. 2 is a graph demonstrating the change in viscosity of a crosslinked polymer fluid when combined with a polyortho ester.

FIG. 2 shows the viscosity change over time after combining 40 lb/Mgal borate-crosslinked guar with 40 lb of a polyortho ester (specifically, trimethylorthoformate+glycerol) per thousand gal of fluid. The initial pH is 11.19, and the final pH is 2.5.

Embodiments disclosed herein include:

A: A method of treating a wellbore in a subterranean formation comprising: placing a first stream comprising a first fluid, a carrier fluid comprising a brine, and a metal crosslinker into a formation, wherein the first fluid comprises: a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof, allowing the polymer of said first stream to crosslink, and allowing the crosslinked polymer to become un-crosslinked.

B: A method comprising: placing a first stream comprising a first fluid, a carrier fluid comprising a brine, and a metal crosslinker into a subterranean formation, wherein the first fluid comprises: a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof, wherein said first stream has an initial pH less than about 1, allowing the pH of the placed first stream to rise to at least about 8, allowing the crosslinked polymer of said first stream to crosslink, and allowing the pH of the fluid containing the crosslinked polymer to decrease to less than about 1, thereby hydrolyzing the polymer backbone of the crosslinked polymer.

C: A wellbore fluid comprising: a crosslinkable polymer, said crosslinkable polymer prepared by a redox reaction with vinyl phosphonic acid monomers or polymers and a polysaccharide, and, at least one of a hydrolysable in-situ acid generator, a chelating agent, and mixtures thereof, a carrier fluid comprising a brine; and a metal crosslinker.

D: A wellbore treatment system comprising: an apparatus configured to: place a first stream comprising a first fluid, a carrier fluid comprising a brine, and a metal crosslinker into a subterranean formation, wherein the first fluid comprises: a crosslinkable polymer, said crosslinkable polymer prepared by a redox reaction with vinyl phosphonic acid monomers or polymers and a polysaccharide, and at least one of a hydrolysable in-situ acid generator, a chelating agent, and mixtures thereof, allow the polymer of said first stream to crosslink, and allow the crosslinked polymer to become un-crosslinked.

Each of elements A, B, C, and D may have one or more of the following additional elements in any combination: Element 1: wherein the polysaccharide is at least one member selected from the group of guar, hydroxypropyl guar, hydroxyethyl cellulose, hydroxypropyl cellulose, and mixtures thereof. Element 2: wherein the crosslinkable polymer is a graft copolymer of hydroxyethylcellulose. Element 3: wherein the hydrolysable in-situ acid generator comprises at least one hydrolysable strong acid ester that upon hydrolyzing yields an acid with a pKa of at most about zero. Element 4: wherein the hydrolysable acid ester comprises at least one member selected from the group consisting of trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates), methyl tosylate and homologous series; methyl methane sulfonate and homologous series; methyl trichloroacetate and homologous series; methyl trifluroacetate and homologous series; dimethyl methylphosphonate and homologous series; and any combination thereof. Element 5: wherein the chelating agent un-crosslinks the crosslinked polymer. Element 6: wherein the chelating agent comprises at least one of the following: hydrolysable in-situ chelating agent generating compounds, hydrolysable in-situ chelating agent generating compounds, ethylenediamine tetracetic acid (EDTA), nitrilotriacetic acid (NTA), N-(2-hydroxyethyl)ethylenediaminetetraacetic acid (HEDTA), glutamic acid diacetic acid (GLDA), methylglycine diacetic acid (MGDA), iminodisuccinic acid (IDS), propylenediaminetetraacetic acid (PDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, β-alanine diacetic acid (β-ADA), ethylenediaminedisuccinic acid, S,S-ethylenediaminedisuccinic acid (EDDS), hydroxyiminodisuccinic acid (HIDS), polyamino disuccinic acids, N-bis[2-(1,2 -dicarboxyethoxy)ethyl]glycine (BCA6), N-bis[2-(1,2 -dicarboxyethoxy)ethyl]aspartic acid (BCA5), N-bis[2-(1,2 -dicarboxyethoxy)ethyl]methylglycine (MCBA5), N-tris[(1,2 -dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2 -acetamido)iminodiacetic acid (ADA), hydroxymethyl-iminodiacetic acid, 2-(2 -carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N' -disuccinic acid, 1,2-propylenediamine-N,N'-disuccinic acid, 1,3 -propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, and any combination thereof. Element 7: wherein the initial pH of the first fluid is less than about 1. Element 8: wherein upon being hydrolyzed, the hydrolysable in-situ acid generator decreases the pH of the fluid containing the crosslinked polymer to less than about 5. Element 9: wherein the wherein the hydrolysable in-situ acid generator decreases the pH of the crosslinked polymer fluid such that the crosslinked polymer fluid becomes at least partially un-crosslinked. Element 10: wherein at least one of the first fluid hydrolysable in-situ acid generator and chelating agent are encapsulated in a degradable material. Element 11: wherein the degradable material is a hydrolysable material that delays the generating of the acid or exposing of the chelating agent to the fluids in the formation. Element 12: wherein the hydrolysable in-situ acid generator is an orthoester with the general formula RC(OR')(OR'')(OR'''), wherein R is a hydrogen, an alkyl group, or an aryl group, wherein R', R'', and R''' are each an alkyl group or an aryl group but not hydrogen, and R', R'', and R''' may or may not be the same group. Element 13: wherein the metal crosslinker raises the pH to at least about 8. Element 14: wherein upon being hydrolyzed, the hydrolysable in-situ acid generator decreases the pH of the fluid containing the crosslinked polymer to less than about 1, thereby hydrolyzing the backbone of the polymer. Element 15: wherein the brines are selected from the group consisting of NaCl, KCl, $CaCl_2$, NaBr, $NH_4Cl$, sea water, $CaCl_2/CaBr_2$, and combinations thereof. Element 16: further comprising a mixing tank fluidly coupled to a tubular, wherein the first stream is formulated in the mixing tank. Element 17: further comprising a pump fluidly coupled to said tubular, wherein said pump and tubular are used to transport the first stream from the mixing tank to a wellhead. Element 18: further comprising a mixing tank fluidly coupled to a tubular, wherein the first fluid is formulated in the mixing tank. Element 19: wherein the carrier fluid and metal crosslinker are combined with the first fluid after the first fluid leaves the mixing tank.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating a wellbore in a subterranean formation comprising:
    placing a lost circulation treatment fluid into a lost circulation zone in the subterranean formation, the lost circulation treatment fluid comprising:
        a carrier fluid comprising a brine;
        a crosslinkable polymer prepared by a redox reaction with vinyl phosphonic acid monomers or polymers and a polysaccharide;
        a hydrolysable in-situ acid generator;
        a chelating agent; and
        a metal crosslinker;
    allowing at least a portion of the crosslinkable polymer to crosslink to form a crosslinked polymer;
    allowing the hydrolysable in-situ acid generator to generate an acid and lower a pH of the lost circulation treatment fluid; and
    allowing at least a portion of the crosslinked polymer to become un-crosslinked in response to the pH of the lost circulation treatment fluid.

2. The method of claim 1, wherein the polysaccharide is selected from the group consisting of guar, hydroxypropyl guar, hydroxyethyl cellulose, hydroxypropyl cellulose, and mixtures thereof.

3. The method of claim 1, wherein the crosslinkable polymer is a graft copolymer of hydroxyethylcellulose.

4. The method of claim 1, wherein the hydrolysable in-situ acid generator comprises at least one hydrolysable strong acid ester that upon hydrolyzing yields an acid with a pKa of at most about zero.

5. The method of claim 4, wherein the hydrolysable strong acid ester comprises at least one member selected from the group consisting of trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates), methyl tosylate and homologous series; methyl methane sulfonate and homologous series; methyl trichloroacetate and homologous series; methyl trifluroacetate and homologous series; dimethyl methylphosphonate and homologous series; and any combination thereof.

6. The method of claim 1, wherein the chelating agent un-crosslinks the crosslinked polymer.

7. The method of claim 1, wherein the chelating agent comprises at least one of the following: hydrolysable in-situ chelating agent generating compounds, ethylenediamine tetracetic acid (EDTA), nitrilotriacetic acid (NTA), N-(2-hydroxyethyl)ethyienediaminetriacetic acid (HEDTA), glutamic acid diacetic acid (GLDA), methylglycine diacetic acid (MGDA), iminodisuccinic acid (IDS), propylenediaminetetraacetic acid (PDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, β-alanine diacetic acid (β-ADA), ethylenediaminedisuccinic acid, S,S -ethylenediaminedisuccinic acid (EDDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysucciny)]-L-serine, aspartic acid-N,N-diacetic acid, aspartic acid-N-monoacetic acid, any salt thereof, any derivative thereof, and any combination thereof.

8. The method of claim 1, wherein an initial pH of the lost circulation treatment fluid is less than about 1.

9. The method of claim 1, wherein upon being hydrolyzed, the hydrolysable in-situ acid generator decreases a pH of the lost circulation treatment fluid containing the crosslinked polymer to less than about 5.

10. The method of claim 1, wherein the hydrolysable in-situ acid generator decreases a pH of the lost circulation treatment fluid comprising the crosslinked polymer such that the crosslinked polymer becomes at least partially un-crosslinked.

11. The method of claim 1, wherein at least one of the hydrolysable in-situ acid generator or the chelating agent are encapsulated in a degradable material.

12. The method of claim 11, wherein the degradable material is a hydrolysable material that delays generation of an acid by the hydrolysable in-situ acid generator or exposure of the chelating agent to a fluid present in the subterranean formation.

13. The method of claim 1, wherein the hydrolysable in-situ acid generator is an orthoester with a general formula RC(OR')(OR")(OR'''), wherein R is a hydrogen, an alkyl group, or an aryl group, wherein R', R", and R''' are each an alkyl group or an aryl group but not hydrogen, and R', R", and R''' may or may not be the same group.

14. The method of claim 1, wherein the metal crosslinker raises a pH of the lost circulation treatment fluid to at least about 8.

15. The method of claim 1, wherein upon being hydrolyzed, the hydrolysable in-situ acid generator decreases a pH of the lost circulation treatment fluid comprising the crosslinked polymer to less than about 1, thereby hydrolyzing a backbone of the crosslinked polymer.

16. The method of claim 1, wherein the brine is selected from the group consisting of NaCl, KCl, $CaC_2$, NaBr, $NH_4Cl$, sea water, $CaCl_2/CaBr_2$, and combinations thereof.

17. The method of claim 1, further comprising mixing the lost circulation treatment fluid in a mixing tank fluidly coupled to a tubular.

18. The method of claim 17, further comprising transporting the lost circulation treatment fluid to a wellhead by a pump fluidly coupled to said tubular.

19. A method comprising:
placing a lost circulation treatment fluid into a subterranean formation, the lost circulation treatment fluid comprising:
a first fluid comprising a crosslinkable polymer prepared by a redox reaction with vinyl phosphonic acid monomers or polymers and a polysaccharide, a hydrolysable in-situ acid generator, and a chelating agent;
a carrier fluid comprising a brine; and
a metal crosslinker,
wherein the lost circulation treatment fluid has an initial pH less than about 1;
allowing the pH of the lost circulation treatment fluid to rise to at least about 8;
allowing at least a portion of the crosslinkable polymer to crosslink to form a crosslinked polymer; and
allowing the hydrolysable in-situ acid generator to generate an acid and decrease the pH of the lost circulation treatment fluid to less than about 1; and
allowing at least a portion of the crosslinked polymer to become un-crosslinked in response to the pH of the lost circulation treatment fluid.

20. The method of claim 19, wherein the polysaccharide is at least one member selected from the group of guar, hydroxypropyl guar, hydroxyethyl cellulose, hydroxypropyl cellulose, and mixtures thereof.

21. A wellbore treatment system comprising:
an apparatus configured to:
   mix a lost circulation treatment fluid comprising a first fluid, a carrier fluid comprising a brine, and a metal crosslinker, wherein the first fluid comprises:
      a crosslinkable polymer, said crosslinkable polymer prepared by a redox reaction with vinyl phosphonic acid monomers or polymers and a polysaccharide, a hydrolysable in-situ acid generator, and a chelating agent;
   place the lost circulation treatment fluid into the subterranean formation;
   allow the polymer of said first stream to crosslink; and
   allow the crosslinked polymer to become un-crosslinked.

* * * * *